United States Patent
Adriansens (10) Patent No.: US 9,844,896 B2
(45) Date of Patent: Dec. 19, 2017

(54) METHOD OF RECYCLING AIR CONTAINING A STERILIZING AGENT, AND CONTAINER MANUFACTURING PLANT COMPRISING AN AIR RECYCLING CIRCUIT

(75) Inventor: Eric Adriansens, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 941 days.

(21) Appl. No.: 13/702,323

(22) PCT Filed: Jun. 1, 2011

(86) PCT No.: PCT/EP2011/059023
§ 371 (c)(1),
(2), (4) Date: Dec. 6, 2012

(87) PCT Pub. No.: WO2011/154294
PCT Pub. Date: Dec. 15, 2011

(65) Prior Publication Data
US 2013/0078327 A1 Mar. 28, 2013

(30) Foreign Application Priority Data
Jun. 10, 2010 (FR) ..................................... 10 54593

(51) Int. Cl.
*B29C 49/46* (2006.01)
*B29C 37/00* (2006.01)
(Continued)

(52) U.S. Cl.
CPC .............. *B29C 37/00* (2013.01); *B01D 53/00* (2013.01); *B29C 49/46* (2013.01); *B29C 49/68* (2013.01);
(Continued)

(58) Field of Classification Search
CPC . B29C 49/4284; B29C 49/46; B29C 49/4602; B29C 49/58; B29C 49/78;
(Continued)

(56) References Cited

U.S. PATENT DOCUMENTS

| 5,322,651 A | 6/1994 | Emmer |
| 6,984,360 B1 | 1/2006 | Feuilloley et al. |

(Continued)

FOREIGN PATENT DOCUMENTS

| DE | 19945500 | 4/2000 |
| DE | 60204543 | 5/2006 |

(Continued)

OTHER PUBLICATIONS

"English Abstract for FR 2 907 684", printed on Sep. 21, 2015.*
(Continued)

*Primary Examiner* — Seyed Masoud Malekzadeh
(74) *Attorney, Agent, or Firm* — Young & Thompson (57) ABSTRACT

A container manufacturing plant (10) includes an air circuit (78) employing a recycling method that includes at least the successive steps of: extracting filtered air from an oven (26), after the air has been used in the latter, for the purpose of cooling at least one part of the preforms; treating the sterilizing agent present in the extracted air resulting from the sterilization of the preforms; and recycling the extracted and treated air to the industrial area (16) where the plant (10) is installed. An air recycling method is also described.

16 Claims, 3 Drawing Sheets

(51) Int. Cl.
  B29C 49/68      (2006.01)
  B01D 53/00      (2006.01)
  *B29C 49/58*       (2006.01)
  *B29C 49/42*       (2006.01)
  *B29C 49/78*       (2006.01)
  *B65B 55/10*       (2006.01)
  *B29C 49/06*       (2006.01)
  *B29C 49/64*       (2006.01)

(52) U.S. Cl.
  CPC .......... *B29C 49/06* (2013.01); *B29C 49/4284* (2013.01); *B29C 49/58* (2013.01); *B29C 49/6418* (2013.01); *B29C 49/78* (2013.01); *B29C 2049/4602* (2013.01); *B29C 2049/4632* (2013.01); *B29C 2049/4635* (2013.01); *B29C 2049/4679* (2013.01); *B65B 55/10* (2013.01); *B65B 55/103* (2013.01)

(58) Field of Classification Search
  CPC ............... B29C 49/783; B29C 49/786; B29C 2049/4632; B29C 2049/4635; B29C 2049/4679; B29C 2049/4602; B29C 49/68; B29C 37/00; B29C 49/06; B29C 49/6418; B65B 55/10; B65B 55/103; B01D 53/00
  USPC .... 425/72.1, 73, 74, 86, 210, 225, 404, 445, 425/526, 534, 538
  See application file for complete search history.

(56) References Cited

U.S. PATENT DOCUMENTS

| | | | |
|---|---|---|---|
| 7,186,374 B2 | 3/2007 | Zelina et al. | |
| 7,448,866 B2 | 11/2008 | Doudement | |
| 7,806,680 B2* | 10/2010 | Adriansens | A61L 2/04 422/304 |
| 7,866,355 B2 | 1/2011 | Quetel et al. | |
| 8,083,512 B2* | 12/2011 | Adriansens | A61L 2/04 422/303 |
| 8,257,073 B2 | 9/2012 | Quetel et al. | |
| 2002/0159915 A1 | 10/2002 | Zelina et al. | |
| 2008/0152538 A1 | 6/2008 | Quetel et al. | |
| 2008/0260887 A1* | 10/2008 | Adriansens | B29C 49/46 425/524 |
| 2009/0317506 A1* | 12/2009 | Adriansens | A61L 2/04 425/103 |
| 2010/0015269 A1* | 1/2010 | Matsushita | B29C 49/46 425/143 |
| 2010/0136160 A1* | 6/2010 | Quetel | B29C 49/46 425/547 |
| 2010/0213629 A1* | 8/2010 | Adriansens | B29C 49/78 264/40.5 |
| 2011/0286899 A1 | 11/2011 | Martini et al. | |

FOREIGN PATENT DOCUMENTS

| | | | |
|---|---|---|---|
| DE | 102008030156 | 12/2009 | |
| EP | 1 699 613 | 9/2006 | |
| EP | 1 941 913 | 7/2008 | |
| EP | 2 191 953 | 6/2010 | |
| EP | 2388128 | 11/2011 | |
| EP | 2138298 | 12/2014 | |
| FR | 2 774 912 | 8/1999 | |
| FR | 2 899 219 | 10/2007 | |
| FR | 2907684 A1 * | 5/2008 | ............... A61L 2/04 |
| JP | H11348922 A | 12/1999 | |
| JP | 2008 207434 | 9/2008 | |
| WO | 2005/070793 | 8/2005 | |
| WO | 2006/136498 | 12/2006 | |
| WO | 2006/136499 | 12/2006 | |
| WO | 2008/049876 | 5/2008 | |

OTHER PUBLICATIONS

"English Translation for FR 2 907 684", printed on Sep. 21, 2015.*
International Search Report dated Jul. 21, 2011, corresponding to PCT/EP2011/059023.
Streckblasformen, pp. 170-172 ; printed on year: 2014.
Streckblasformen, pp. 168-169 ; printed on year: 2014.

* cited by examiner

METHOD OF RECYCLING AIR CONTAINING A STERILIZING AGENT, AND CONTAINER MANUFACTURING PLANT COMPRISING AN AIR RECYCLING CIRCUIT

FIELD OF THE INVENTION

The present invention relates to a method for recycling air containing a sterilizing agent and a container manufacturing installation comprising an air recycling circuit.

BACKGROUND OF THE INVENTION

The invention relates more particularly to an installation for manufacturing containers from a preform made of thermoplastic material, comprising at least one protection chamber intended to isolate an internal volume of the installation from the ambient air contained in industrial premises where the installation is located and comprising, arranged in said internal volume, at least:
- a device for decontaminating the preforms by the application of at least one sterilizing agent,
- a thermal conditioning unit for the preforms consisting of an oven comprising heating means associated with an air cooling device which comprises means for filtering the ambient air and ventilation means specifically for ensuring a cooling of at least a part of the preforms,
- a unit for transforming the preforms into containers, and comprising an extraction system suitable for extracting, from the internal volume of the chamber, air charged with sterilizing agent to evacuate it into the atmosphere, outside the industrial premises, via at least one exhaust duct.

Installations of this type are known, for manufacturing containers, in particular bottles, flasks, etc. from preforms or blanks previously obtained by injection of thermoplastic material, in particular of PET (polyethylene terephthalate).

As an example, the document EP-2.191.953 describes in particular a thermal conditioning oven for a container manufacturing installation.

To produce sterile or aseptic containers, the installation generally includes a decontamination device or module suitable for treating the preforms by means of a sterilizing agent.

In the field of container manufacturing, the sterilizing agents used are, for example, hydrogen peroxide ($H_2O_2$), peracetic acid or any other product recognized for its aseptic, in particular bactericidal, properties.

According to the teachings of the document WO-2006/136498 or WO-2006/136499, the decontamination device is, for example, suitable for spraying toward the preforms a flow of sterilizing vapor, advantageously a jet of dry vapor, containing a vaporized sterilizing agent intended to be deposited by condensation in the form of a uniform film of sterilizing agent mist, at least on the internal wall of the preforms to be sterilized.

The preforms are then introduced into the oven of the thermal conditioning unit where the heating means, for example infrared radiation lamps, then provoke the thermal activation and the evaporation of the sterilizing agent previously deposited by condensation.

When the installation comprises such decontamination devices, it is necessary to prevent the diffusion of sterilizing agent in the ambient air around the installation, in particular when the latter is in the gaseous state.

In fact, the vapors of sterilizing agent such as hydrogen peroxide are, on the one hand, poisonous to human health and, on the other hand, corrosive to the metal materials used in the installation, in particular in the oven or the transformation unit.

Consequently, it is important to ensure both the protection of the operators working on the installation and that of the installation itself in order to avoid the degradations that can be attributed to the corrosive effects of the vapors of sterilizing agent.

This is one of the reasons why a container manufacturing installation generally includes a protection chamber ensuring the individual containment of all the manufacturing means and an associated extraction system for evacuating the air charged with sterilizing agent.

In some of the Applicant's installations, the extraction system comprises at least first extraction means associated with the decontamination device that are intended to evacuate into the atmosphere the air contained in a sterilization chamber of the device, that is to say evacuate the air charged with sterilizing agent outside the building in industrial premises in which the installation is located.

The air contained in the sterilization chamber is the most charged with sterilizing agent, notably present in this air in the gaseous state when it is applied to the preforms according to the abovementioned condensation deposition technique.

However, such a method for applying the sterilizing agent advantageously makes it possible to considerably reduce the quantity of agent used while obtaining an improved effectiveness.

Preferably, the extraction system of the installation comprises second extraction means which, associated with the oven, are intended to evacuate into the atmosphere, therefore outside the industrial premises, the air contained in the internal volume of the oven delimited by a part of the chamber of the installation.

By virtue of such second means of the extraction system, on the one hand the calories (hot air) and, on the other hand, the sterilizing agent present in a smaller proportion in the gaseous state in this air, are evacuated jointly out of the oven.

It will be recalled that the presence of sterilizing agent in the cooling air extracted from the oven results from the evaporation by heating in the oven of the sterilizing agent, such as that of the uniform film of sterilizing agent deposited by condensation in the sterilization chamber of the decontamination device.

Advantageously, in the extraction system of an installation, the first extraction means associated with the decontamination device comprise a suction duct, the output of which is connected to the exhaust duct that the second extraction means associated with the oven comprise.

Thus, by virtue of the chamber and of the first and second means of the extraction system, the extraction system evacuates to the atmosphere via the exhaust duct, on the one hand, the heat produced by the heating means of the oven with the constantly renewed cooling air introduced by the ventilation means and, on the other hand, the sterilizing agent coming from two sources, namely, respectively, most from the sterilization chamber of the decontamination device and the remainder from the oven.

Ultimately, the concentration of sterilizing agent present in the air discharged by the extraction system conforms to the environmental requirements.

In practice, the concentration of sterilizing agent is primarily high in the sterilization chamber of the decontamination device, said concentration of sterilizing agent being automatically reduced by dilution in the cooling air extracted with a very much higher flow rate by the second means of the extraction system, by virtue of which the concentration of sterilizing agent in the air finally discharged into the atmosphere does not exceed the authorized limit values.

The flow rates of air extracted from the installation by such a system can, for example, reach values of the order of 20 000 to 30 000 m$^3$ of air per hour depending on the type of oven and the dilution phenomenon is directly linked to the significant air consumption of the oven, since that of the decontamination device does not contribute more than 1000 m$^3$ per hour to it.

In such an installation, the air is thus systematically evacuated into the atmosphere via an exhaust duct of the extraction system and this is done to evacuate both the heat and the residues of sterilizing agent.

However, the Applicant has been able to establish that the significance of the air flow rates attributable both to the cooling device and to the extraction system of the installation indirectly had negative consequences on the container manufacturing quality.

In practice, the air evacuated into the atmosphere is automatically replaced in the industrial premises by being mainly renewed by air originating from outside the building housing the industrial premises. Now, the qualities of this atmospheric air, introduced into the industrial premises from outside to compensate the significant quantity of air evacuated by the extraction system, are not controlled.

In particular, the temperature of the air, its relative humidity and even the undesirable presence of dust like bacteria are not controlled and are all parameters directly influencing the quality of manufacture.

In addition, such parameters fluctuate according to the geographic location of the building containing the installation, or even—for one and the same location—according to the season which is likely to modify some of these qualitative parameters such as the temperature of the air (even over one and the same day).

However, for the person skilled in the art, the evacuation of the air by such an extraction system appears essential, in particular because the air contains sterilizing agent.

Furthermore, the person skilled in the art also considers the fact that the extraction system makes it possible to simultaneously evacuate the calories deriving from the heating provided in the oven, thus limiting the transfer of heat from the oven to the ambient air.

To check the quality of the ambient air in the industrial premises, it is possible to resort to a transformation of the industrial premises to make it a "clean room", that is to say a sealed enclosure designed to eliminate dust and microorganisms as far as possible, to obtain ultra-clean manufacturing industrial conditions in the industrial premises.

However, it will easily be understood that, while such a transformation is always possible, the associated costs, both to transform the industrial premises and subsequently to operate the installation, are very high and prohibitive.

It is known from the document EP-1.941.913 to evacuate the vaporized sterilizing agent used to sterilize the preforms, and from the document FR-2.774.912 to recycle the sterilizing agent vapors.

Also known from the document JP-2008.207434 is a conditioned air device recycling air extracted from an area in which an oven is arranged, which air does not however contain any sterilizing agent in the absence of decontamination.

SUMMARY OF THE INVENTION

The aim of the present invention is notably to remedy the abovementioned drawbacks, in particular of air renewal, and to propose a more efficient installation, that is also economical and more environmentally-friendly.

To this end, the invention proposes a method for recycling air containing a sterilizing agent in a container manufacturing installation, characterized in that said method comprises at least the steps consisting successively in:

(a)—extracting from the interior of the chamber of the installation air containing a sterilizing agent;

(b)—treating at least a part of said extracted air to eliminate all or part of said sterilizing agent in order for the final concentration of sterilizing agent in the air to be less than or equal to a determined threshold value;

(c)—recycling the extracted and treated air by reintroducing at least a part of said air into industrial premises where said installation is located.

By virtue of the treatment of the sterilizing agent in the extracted air, it is possible to proceed with the recycling of this air previously and hitherto always discharged into the atmosphere for the abovementioned reasons.

Advantageously, the air recycled according to the method is thus likely to be, in preference to atmospheric air originating from outside the building, reintroduced into the industrial premises forming the direct external environment of the installation equipped with a chamber and an extraction system.

In practice, the recycled air is advantageously intended to be reinjected directly into the industrial premises where this air replaces the air sucked in by the cooling device of the oven comprising the ventilation means and having the greatest air consumption.

By virtue of which, said recycled air is likely to subsequently pass through the protection chamber once again, for example under the suction effect of the ventilation means, to be admitted into the internal volume as cooling air whence this air will then be extracted to be treated in order to be recyclable and advantageously recycled.

Such a recycling of the air goes against the prejudices of the person skilled in the art for whom this air has to be evacuated to the atmosphere because of the presence of sterilizing agent and also of the significant quantity of calories.

To this end, the invention also proposes an installation of the type described previously, characterized in that the installation comprises an air recycling circuit comprising treatment means suitable for eliminating all or part of the sterilizing agent from at least a part of the air extracted using the extraction system in order to obtain treated air which, having a concentration of sterilizing agent less than or equal to a determined threshold value, is recycled by being reintroduced into the industrial premises forming the external environment of said installation.

Advantageously, an installation equipped with a recycling circuit according to the invention is more environmentally-friendly in that it makes it possible at the very least to reduce, or even eliminate, the discharges of sterilizing agent into the atmosphere.

By virtue of the method and of the recycling circuit according to the invention, the ambient air present in the industrial premises, notably sucked in by the air cooling device of the oven, is constantly renewed by recycled air having in particular a quality of cleanliness because of its filtration by the cooling device.

Thus, the air admitted into the installation and in particular into the oven is air of much higher quality, in particular cleaner because of having already been filtered before its admission into the internal volume of the installation and because of having been in contact with the sterilizing agent.

Furthermore, the recycled air has parameters such as relative humidity or temperature which are more easily checked, notably for the temperature by regulating the temperature of the recycled air by cooling means, preferably implemented before proceeding with the reintroduction of the recycled air into the industrial premises.

Advantageously, the recycled air is automatically dried upon circulation in the oven so that the risks of seeing the appearance of steam condensation, for example on the molds or other manufacturing members, are also reduced.

It will be recalled that such problems are sometimes encountered in certain geographical areas where the atmospheric air has a particularly high, even saturated, relative humidity.

By virtue of the invention, it is consequently no longer necessary to resort to setting up a clean room to circumvent the fluctuation of the parameters of the ambient air.

According to other features of the installation:
- the air recycling circuit comprises at least one recirculation duct comprising, respectively, an input linked to the exhaust duct of the extraction system and an output opening directly into the industrial premises where said installation is located, said treatment means intended to eliminate all or part of the sterilizing agent present in the extracted air circulating in said recirculation duct being at least arranged between said input and output of the recirculation duct;
- the air recycling circuit comprises regulation means suitable for selectively controlling the distribution of the flow of extracted air between the exhaust duct opening into the atmosphere outside the industrial premises and the recirculation duct opening directly into the industrial premises where the installation is located;
- the treatment means are made up of at least one filter arranged to be passed through by the flow of extracted air to be treated circulating in the recirculation duct of the recycling circuit and comprising at least one oxidizing element suitable for provoking a catalytic reaction with the air charged with sterilizing agent in order to break down all or part of the sterilizing agent present in the air into other neutral products and achieve at least said threshold value;
- the recycling circuit comprises checking means which, arranged downstream of the treatment means, are suitable for analyzing the concentration of sterilizing agent present in the air so as to check the concentration of sterilizing agent against said determined threshold value;
- the means for checking the recycled air are driven by a control unit which is suitable for selectively actuating regulation means when the concentration of sterilizing agent is greater than said threshold value, in particular suitable for diverting the flow of extracted air exhaust duct;
- the recycling circuit comprises a branch duct, the input of which is linked to the recirculation duct, downstream of the treatment means and upstream of the output of the exhaust duct, so as to evacuate, before the reintroduction into the industrial premises, any air that the checking means analyze as having a concentration of sterilizing agent greater than said threshold value;
- the recycling circuit comprises air cooling means which can be controlled selectively to regulate the temperature of the air circulating in the recirculation duct so that the temperature of said recycled air, intended to be reintroduced into the industrial premises, is less than or equal to a setpoint temperature determined to maintain the ambient temperature of the air in said premises within an optimum temperature range;
- the cooling means are arranged at least in the recirculation duct of the air recycling circuit in order to regulate the temperature of the recycled air;
- the air cooling means comprise at least one heat exchanger of air-fluid type in which a heat transfer fluid is circulated to produce a heat transfer between said heat transfer fluid and the recycled air passing through said exchanger so as to cool said air by transfer and apply a transfer of heat from the air to the heat transfer fluid, which heat can then be used notably for the purposes of heating the industrial premises or of hot water production;
- the extraction system comprising at least first extraction means associated with the decontamination device and second extraction means associated with the oven, the treatment means are arranged between a sterilization chamber of the device from which the first extraction means suck the air charged with sterilizing agent and a suction duct, the input of which is linked to said first means and the output of which is linked to the exhaust duct;
- the extraction system comprises at least one suction hood which, associated with the decontamination device, constitutes the first extraction means;
- the extraction system comprises at least one hood, called main hood, constituting the second extraction means associated with the oven, said main hood communicating with the input of the exhaust duct and complementing the portion of the chamber surrounding the thermal conditioning unit so as to enclose its top part to isolate said area of the internal volume containing at least the oven, from the external environment.

BRIEF DESCRIPTION OF DRAWINGS

Other features and advantages of the invention, as well as details of design and production, will emerge from reading the following detailed description, for an understanding of which reference should be made to the appended drawings in which.

DETAILED DESCRIPTION OF THE INVENTION

In the description and the claims, the terms "front" or "rear" with reference to the longitudinal direction, "top" and "bottom", with reference to the vertical direction and according to the earth's gravity, and the longitudinal, vertical and transversal directions with reference to the trihedra (L, V, T) indicated in the figures, will be adopted by convention and in a nonlimiting manner.

The expressions "upstream" and "downstream" will also be used with reference to the direction of circulation of the flow of air in the installation and/or in the air recycling circuit.

Figure 1:
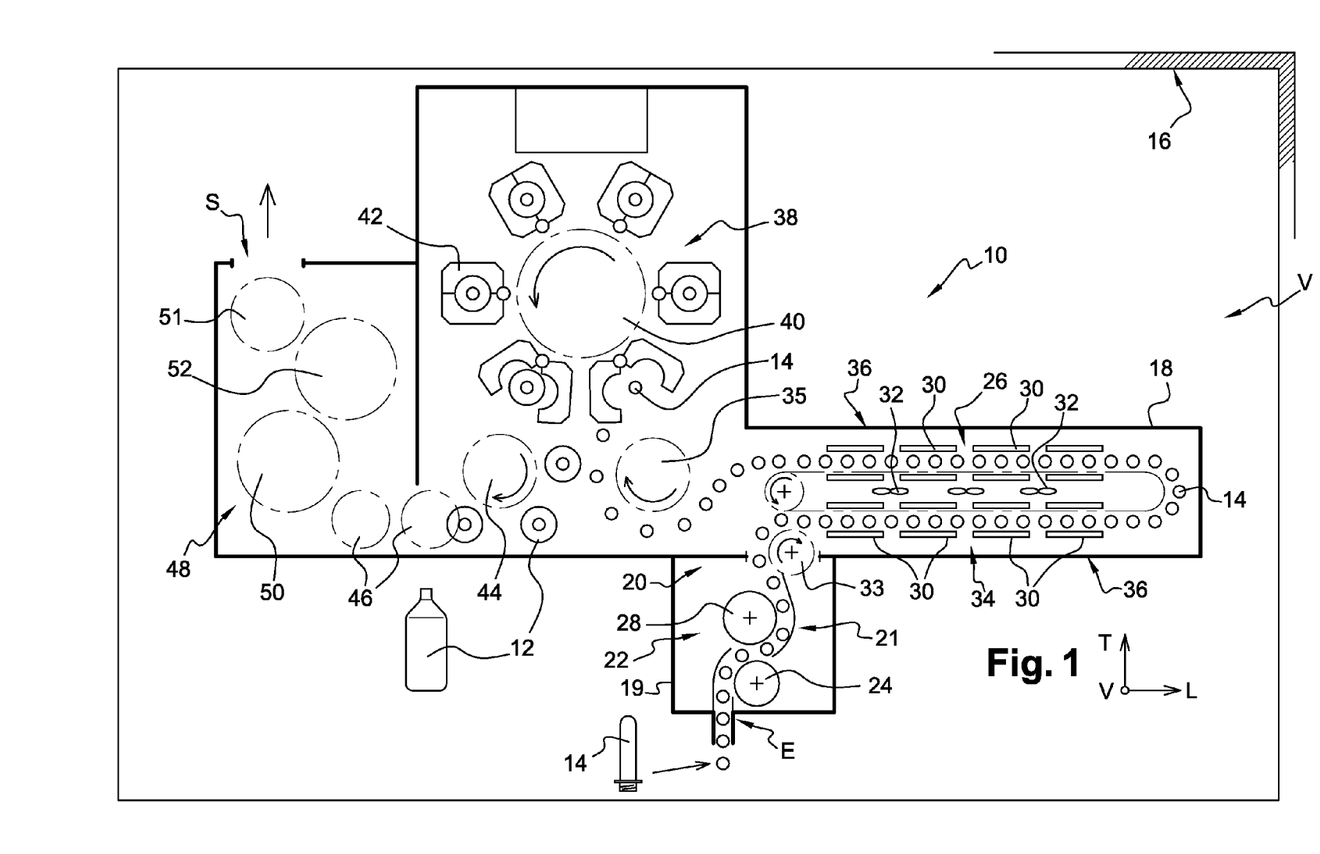
FIG. 1 is a schematic plan view which partially represents a container manufacturing installation of the Applicant illustrating the state of the art.

FIG. 1 schematically represents an installation 10 for manufacturing containers 12 from a preform 14 made of thermoplastic material which, in a nonlimiting manner, illustrates an exemplary embodiment of an installation constituting the state of the art for the Applicant.

FIG. 1 represents also an exemplary preform 14 for the manufacture of a container 12 forming a hollow body, said preform 14 being intended to be thermally conditioned then transformed to obtain said container 12, such as a bottle, a flask, etc.

Preferably, the operation of transforming the thermally conditioned preform 14 is performed by blowing or by stretching-blowing, in a full or partial variant by filling by means of a liquid under pressure designed to form the container.

By definition, the term "container" hereinafter in the present description designates both the final container obtained by a manufacturing method with a single step of transforming a preform directly culminating in the final container, such as the bottle illustrated in detail in FIG. 1, and an intermediate container obtained in the case of implementation of a method with several transformation steps.

The installation 10 is located in industrial premises 16, generally sealed, within a building (not represented) and which premises have a volume V of ambient air forming a determined external environment around the installation 10.

Advantageously, the installation 10 comprises at least one protection chamber 18 of the installation intended to isolate, from said external environment formed by the ambient air of the industrial premises 16 where the installation 10 is located, an internal volume 20 of the installation 10 inside which are arranged the various container 12 manufacturing means.

The installation 10 is associated with a system supplying preforms 14. Such a supply system (not represented) is for example described in the document WO-2005/070793 to which reference should be made for fuller details.

The supply system comprises, for example, a hopper in which preforms 14 are stored in bulk and from which they are taken by lift means to be placed in position, generally in a line one after the other, between inclined rails which convey said preforms 14 by gravity to take-over means arranged at an input E of the installation 10.

Preferably, the preforms 14 are positioned in a determined position, for example neck uppermost to rest on the rails via their collar.

Elimination means as described in the document WO-2005/070793 are advantageously arranged on the path in order to eliminate badly positioned preforms 14.

The installation 10 comprises a device 22 for decontaminating the preforms 14, notably by the application of at least one sterilizing agent.

The decontamination device 22, also called decontamination module, is advantageously designed as a standalone device in order to be able to be included selectively in the installation 10 according to the applications.

The decontamination device 22 or module of the installation 10 comprises a protection chamber 19 which is preferably separate from the chamber 18, as a variant which is formed by a portion of the overall protection chamber 18 delimiting the internal volume 20 containing said means for manufacturing the containers 12.

The protection chamber 19 of the decontamination device 22 delimits an internal volume forming a sterilization chamber 21 in which the preforms 14 are treated by means of a sterilizing agent.

Preferably, the device 22 for decontaminating the preforms 14 comprises means (not represented) for decontaminating by ultraviolet radiation suitable for sterilizing all or part of the preform, in particular the necks of the preforms 14.

Such ultraviolet radiation decontamination means are, for example, arranged along the path of the preforms 14 defined by the rails of the supply system.

At the bottom end of the rails, the preforms 14 are grasped individually by a loading wheel 24 arranged at the input E of the installation 10.

Preferably, the decontamination device 22 is arranged at the input E of the installation 10 and upstream of a thermal conditioning unit mainly comprising at least one oven 26.

Preferably, the decontamination device 22 is designed to spray a jet of dry vapor onto the preforms 14 so as to provoke the deposition by condensation of a uniform film of sterilizing agent mist on at least the internal wall of the preforms 14 to be sterilized.

Advantageously, the sterilizing agent applied by the decontamination device 22 comprises hydrogen peroxide ($H_2O_2$), for example a mixture of water and of hydrogen peroxide which is vaporized by virtue of heating vaporization means (not represented) included in the decontamination device 22.

The decontamination device 22 comprises, for example, a sterilization wheel 28 provided with means for supporting the preforms 14 by virtue of which the preforms 14 circulate necks uppermost under nozzles for applying the flow of dry sterilizing agent vapor which penetrates into the preform 14 through the opening delimited by the neck.

Such a decontamination device 22 is, for example, described in the document FR-2.899.219 to which reference should be made for a more detailed description of said device.

The preforms 14 are then transferred from the sterilization wheel 28 of the decontamination device 22 to the oven 26 by virtue of a transfer wheel 33.

The thermal conditioning unit of the installation 10 formed by the oven 26 mainly comprises heating means 30 and ventilation means 32 that are associated to proceed with the thermal conditioning of the preforms 14.

Advantageously, the oven 26 comprises a cooling device 34 which, associated with the heating means 30, comprises respectively filtration means 36 and said ventilation means 32.

At the input of the oven 26, the preforms 14 are transferred from the wheel 33 to a conveying device (not represented) such as an endless chain bearing support means for the preforms 14 and intended to transport them along a determined path culminating at the output of the oven 26, for example, here, a "U"-shaped path comprising two parallel longitudinal heating sections, one in the forward direction and the other in the return direction, connected together by a transversal curvilinear section, called stabilization section.

Preferably, the support means of the conveying device are suitable for causing each preform 14 to rotate on itself in order to favor an appropriate distribution of the heat in the body of each preform 14.

The document EP-1.699.613 describes an exemplary oven comprising heating means and ventilation means for the thermal conditioning of preforms.

Advantageously, the oven comprises means for sterilization by the emission of ultraviolet radiation which are arranged in the curvilinear stabilization section as described in the document WO-2008/049876.

After their thermal conditioning by the oven 26, the preforms 14 are transported by at least one transfer wheel 35 from the output of the oven 26 to a unit 38 for transforming the preforms 14 into containers 12.

Advantageously, the transformation unit 38 here consists of a blowing machine (or blower).

In the example represented in FIG. 1, the blowing machine is of the rotary type and comprises a carousel 40 equipped with a plurality of stations which are distributed circumferentially and which are each provided mainly with molding means 42 and associated means (not represented) for blowing or stretching-blowing.

Preferably, the containers 12 obtained are then transported, for example by transfer wheels 44, 46, to a filling unit 48.

Advantageously, the filling unit 48 comprises at least one filling machine 50 and preferably also a plugging machine 52, said machines 50, 52 (not represented in detail) being suitable for proceeding successively with the filling of the containers 12 then with the sealing of the filled containers 12, for example by means of screw stoppers complementing the necks.

Preferably, the filling unit 48 is juxtaposed with the transformation unit 38 so as to obtain a compact installation 10 in which all of the manufacturing process is implemented to the point where containers 12 that are filled and sealed, even also labeled, are finally obtained.

The containers 12 are, for example, routed to an output S by a transfer wheel 51 and are then likely to be packaged, in particular placed in batches, packed and palletized, so they can be shipped for marketing.

As illustrated in FIG. 1, the protection chamber 18 of the installation 10 delimits a general internal volume 20 in which are arranged all the manufacturing means 26, 38, 48 which have just been described and which are thus contained, isolated from the ambient air of the external environment, just as the sterilization chamber 21 of the decontamination device 22 is isolated by the protection chamber 19.

The chambers 18, 19 are shown by bold lines in FIG. 1 and, for example, consist of a set of vertical walls formed by panels and, where appropriate, at least one horizontal wall to form a ceiling.

There now follows a description of the operation and the circulations of air that occur between the ambient air contained in the industrial premises 16 and the installation 10 which is located therein.

In such an installation 10, the circulation of the air in the oven 26 begins with the suction by the ventilation means 32 of the device or module 22 for decontaminating ambient air which is drawn into the industrial premises 16.

Preferably, the air is filtered by the filtration means 36 of the cooling device 34 when it is introduced into the oven 26.

Figure 2:
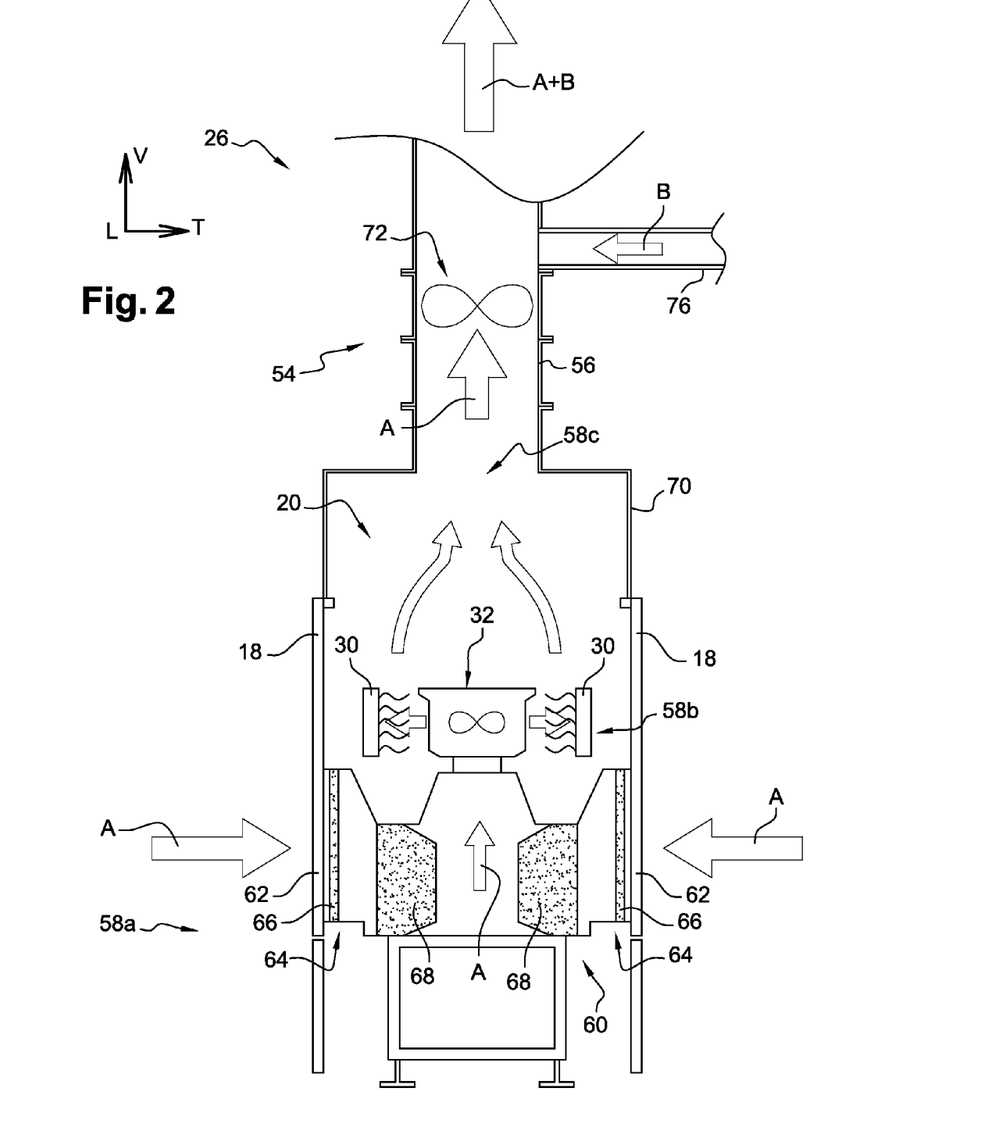
FIG. 2 is a cross-sectional view of the oven of the thermal conditioning unit of an installation according to FIG. 1 and which partly illustrates the extraction system.

The corresponding flow of air is illustrated in FIG. 2 by arrows "A" in the vicinity of the intake openings for the air intended for the cooling of at least a part of the preforms 14.

Inside the oven 26, the filtered air is brought to the area of heating of the preforms 14 where the air comes in particular into contact with the bodies of the preforms 14 to apply their cooling, preferably also that of the necks of the preforms and of their support means.

The installation 10 comprises an air extraction system 54 preferably comprising at least first extraction means 74 (FIG. 3) associated with the decontamination device 22 and second extraction means 70 associated with the oven 26.

Figure 3:
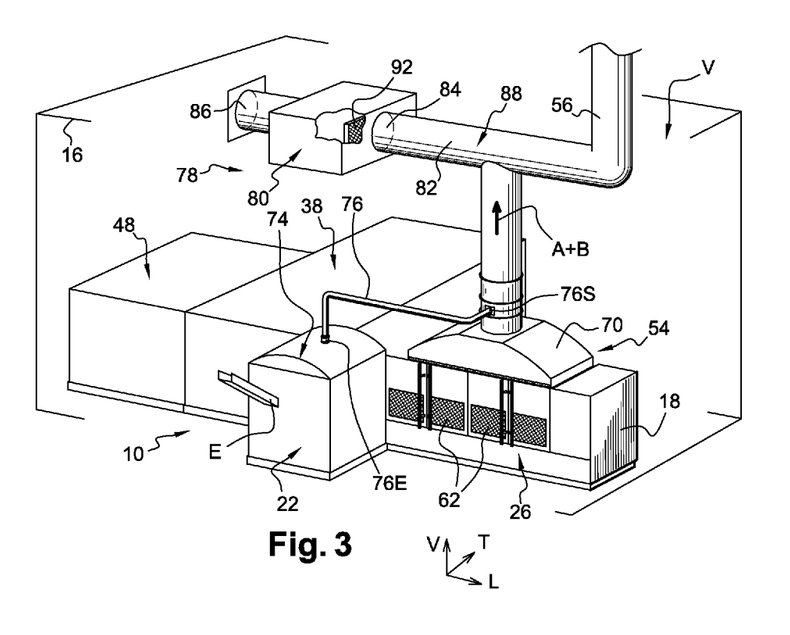
FIG. 3 is a perspective view which represents an installation according to FIG. 1 and which illustrates the associated extraction system and the recycling circuit according to an exemplary embodiment of the invention.

The first extraction means 74 are intended to extract the air charged with sterilizing agent contained in the sterilization chamber 21 of the decontamination device 22 whereas the second extraction means 70 suck from the oven 26 the air used for the cooling which here also contains sterilizing agent.

The extraction system 54 is suitable for extracting from the internal volume air charged with sterilizing agent to evacuate it into the atmosphere outside the industrial premises 16 via at least one exhaust duct 56, such as that which was explained previously.

By virtue of such an air extraction system 54, on the one hand the heat produced by the oven 26 and, on the other hand, in the case of an installation 10 comprising a decontamination device 22, the sterilizing agent present in the air, here in the gaseous state, obtained from the sterilization chamber 21 of the device and also from the evaporation by heating that takes place in the oven 26, are evacuated with the air.

Advantageously, an air insufflation system is associated with the transformation unit 38 which here comprises a blowing machine, said system being incorporated in a top part of the chamber 18 forming a ceiling.

This insufflation system is intended to blow air into the associated part of internal volume 20 isolated from the external environment by a part of the chamber 18, and do so in order to establish therein an overpressure making it possible to effectively reduce the risks of pollution from outside, notably by airborne particulates.

The insufflation system therefore draws from the industrial premises 16 a given volume of ambient air.

A similar air insufflation system equips the filling unit 48 in order to also establish an overpressure inside the internal volume 20 delimited by the chamber 18, the insufflation system drawing the ambient air from the industrial premises 16 where it is located.

By way of nonlimiting examples, the air consumption or air flow rates sucked by an insufflation system of a transformation unit 38 is of the order of 8000 m$^3$ per hour, whereas that of the insufflation system of a filling unit 48 is of the order of 10 000 m$^3$ per hour.

For fuller details on the production and the advantages of such filtered air insufflation systems for locally establishing an overpressure in the area occupied by the machine 38 inside the chamber, reference should advantageously be made to the document FR-2.915.127.

Even greater is the air consumed by the air cooling device 34 associated with the oven 26 since, for example, values of the order of 20 000 to 30 000 m$^3$ per hour are achieved, depending on the type of oven, in particular the number of heating modules.

For an oven 26 of modular design, the air consumption per heating module is of the order of 1300 m$^3$ per hour, the oven being able to comprise, for example, twenty modules.

Now, the quantity of ambient air drawn from the industrial premises 16 by the cooling device 34 and its subsequent evacuation to the atmosphere provoke a massive intake of atmospheric air into the industrial premises 16 to compensate the air which is evacuated by the exhaust duct 56 of the extraction system 54.

Furthermore, the renewal of the ambient air by atmospheric air leads to a significant variation of the qualitative parameters of the air (temperature, humidity, cleanliness, etc.) which directly affect the manufacturing method and more particularly the thermal conditioning since this step is of vital importance in subsequently transforming and obtaining a container 12 of good quality.

Above all, the absence of cleanliness (dust, microorganisms, etc.) of the atmospheric air leads to a degradation in the rate of contamination (degree of sterility) of the containers 12 manufactured.

In addition, this also leads to a premature clogging of the filtration means 36 of the cooling device 34.

One of the consequences is a reduction in the lifetime of the filtration means and an increase in the frequency of maintenance operations requiring a complete manufacturing shutdown, without which the degree of cleanliness of the containers 12 manufactured is directly affected and rapidly degraded.

The negative impact therefore relates as much to the operating costs of the container manufacturing installation 10 as to the quality of the containers 12 manufactured, including the degree of cleanliness.

As illustrated in FIG. 2, the air extraction system 54 comprises at least one exhaust duct 56 via which the air extracted from the internal volume 20 can be evacuated, the output of said exhaust duct 56 opening into the atmosphere, that is to say outside the industrial premises 16.

FIG. 2 represents a transversal cross-sectional view of the oven 26 and illustrates more particularly by arrows the circulation of the air sucked into the oven 26 in order to cool the preforms 14 therein during thermal conditioning by the heating means 30.

In the exemplary embodiment represented in a nonlimiting manner in FIGS. 1 to 3, the oven 26 overall has the form of a tunnel which extends longitudinally, from back to front, from a first open rear end where the transfer wheels 33 and 35 for the preforms 14 respectively associated with the input and the output of the oven 26 are arranged and as far as a second front end which, adjacent to the stabilization section, is sealed by one of the walls of the chamber 18.

However, the oven 26 opens onto an area that is overpressurized because of the air insufflation system advantageously associated with the blowing machine of the transformation unit 38 and contained in the internal volume 20 isolated by the chamber 18 from the ambient air of the industrial premises 16, by virtue of which the risks of pollution of the internal manufacturing volume 20, notably by airborne particulates, are effectively reduced.

As can be seen in FIG. 2, the oven 26 is passed through by a flow of air A for cooling the preforms 14, which flows from upstream to downstream through the oven 26, more specifically, here, vertically from bottom to top.

The path of the cooling air in the oven 26 comprises, successively, in the direction of flow of the flow of air A, an air intake area 58a, also called upstream area, an area 58b for heating the preforms 14 and an air extraction area 58c, also called downstream area.

Advantageously, the extraction system 54 is arranged at least above the oven 26 so as to extract the air used for cooling from the extraction area 58c.

The flow of the flow of air A takes place successively through the vertically superposed areas 58a, 58b, 58c, that is to say along a thermal gradient from the coldest area to the hottest area in order to exploit the convection principle.

Preferably, the air intake area 58a comprises at least one air distribution chamber 60, called plenum, which is here in the form of a parallelepipedal box enclosure in which the flow of cooling air A penetrates by passing through a ventilation grill 62 arranged in the chamber 18.

The ambient air of the industrial premises 16 forming the external environment thus flows from outside the oven 26 to the interior of the oven 26 to cool the preforms 14.

The plenum 60 comprises a first large longitudinal vertical face which is equipped with a first air intake mouth 64 preferably having a flared shape with a transversal section that increases outward from the oven 26 and advantageously including the filtration means 36.

Preferably, the filtration means 36 comprise a prefilter 66 which is arranged in the vicinity of an orifice upstream of the intake mouth 64 and a filter 68 which is arranged in the vicinity of an orifice downstream of the intake mouth 64, the section of passage of the prefilter 66 being greater than the section of passage of the filter 68.

Preferably, the prefilter 66 is a gravimetric filter, which is suitable for so-called rough particulates, which are of a determined diameter, for example greater than 10 microns, whereas the filter 68 is a filter which is suitable for filtering so-called fine particulates of a determined diameter, for example greater than 1 micron.

Preferably, the filtration means 36 of the cooling device 34 consist of so-called "absolute" filters, such as filters of "ULPA" type, even of "HEPA" type.

It will be recalled that a "ULPA" filter is an "Ultra Low Penetration Air" filter and that an "HEPA" filter is a "High Efficiency Particulate Air" filter.

By virtue of the filtration means 66, 68, the sucked air introduced into the internal volume 20 of the chamber 18 is made up of filtered air having a high degree of cleanliness, said degree of cleanliness being, however, determined by the type of filters used.

The air is sucked from the plenum 60 by the depression created by the ventilation means 32, for example formed by one or more centrifuge wheels provided with scoops, then blown transversely toward the preforms 14 circulating in the oven 26 along the heating path.

The air blown by the ventilation means 32 flows, for example, through perforated reflectors (not represented), preferably through vertically oriented slots, which are arranged transversely facing the heating means 30 and intended to reflect the infrared radiations in order to increase the effectiveness of the heating, while allowing the passage of the air for cooling the bodies of the preforms 14.

Thus, the ventilation means 32 provoke a continuous movement of the air which is permanently agitated in the vicinity of the heating means 30 in order to cool the preforms 14, in particular to avoid damaging (crystallizing) the external surface of the body of the preforms 14 and to make the heating of the body of the preforms 14 uniform with an appropriate gradient between the external and internal surfaces of the wall of the body.

Furthermore, the ventilation means 32 create an overpressure in the heating area 58b, in the vicinity of the preforms 14, which prevents any air other than the filtered air from coming into contact with the preforms 14.

Advantageously, the ventilation means 32, such as a wheel, are driven in rotation by a motor (not represented).

The heating area 58b comprises conventional means (not represented) for thermally protecting the necks of the preforms 14 which are advantageously cooled by a part of the flow of air A in order to avoid their deformation by heating.

Advantageously, the hood 70 forming the second extraction means of the extraction system 54 is directly above the extraction area 58c and the heating area 58b, said hood 70 being linked to the exhaust duct 56 of the extraction system 54.

The hood 70 complements the walls of the chamber 18 surrounding the oven 26 so as to isolate it from the external environment of the oven 26 and avoid, on the one hand, the outward diffusion of air containing sterilizing agent and, on the other hand, the pollution of the interior of the oven 26 by airborne polluting particulates.

Preferably, the hood 70 comprises a bottom base of rectangular form and has a form that flares outward to the extraction 58c and heating 58b areas, therefore a section of passage that decreases upward.

The exhaust duct 56 of the extraction system 54 comprises at least one associated extraction means 72, for example a fan, which is suitable for creating a depression upstream in the exhaust duct 56.

The flow of air A flows successively in the direction of the arrows represented firstly to ensure the cooling of the preforms 14 from outside the chamber 18 to the interior of the oven 26 forming a part of the internal volume 20 then the hot air charged with sterilizing agent is extracted from the oven 26 by virtue of the hood 70 and the exhaust duct 56 of the extraction system 54, the output of which communicates with the atmosphere, outside the industrial premises 16 where the installation 10 is located.

Advantageously, the extraction system 54 comprises first extraction means formed by a hood 74 associated with the decontamination device 22.

Preferably, and as illustrated in FIG. 1, the device 22 for decontaminating the preforms 14 is arranged upstream of the input of the oven 26.

On the other hand, the device 22 for decontaminating the preforms 14 is arranged downstream of the output of the oven 26, in particular between the oven 26 and the blowing machine 38.

In such a variant, the sterilizing agent is sprayed onto the hot preforms 14 suitable for being transformed in the blowing machine 28 so that the sterilizing agent is directly evaporated without being deposited by condensation.

The hood 74 complements the portion of the chamber 19 isolating said decontamination device 22 from the external environment formed by the industrial premises 16.

Advantageously, the secondary hood 74 communicates with the input 76E of a suction duct 76, the output 76S of which is linked to the exhaust duct 56 connected to the hood 70 associated with the oven 26.

By virtue of the hood 74, a first air extraction is produced as close as possible to the decontamination device 22, that is to say at the point where the concentration of sterilizing agent is highest.

Advantageously, the concentration of sterilizing agent in the air which is then diffused through the internal volume 20, in particular to the oven 26, is reduced.

In practice, some sterilizing agents used such as hydrogen peroxide are corrosive for the metal materials employed in the construction of the installation 10, in particular of the oven 26.

The sterilizing agent present in the flow of air A which is extracted by the hood 70 therefore originates from the evaporation of the sterilizing agent deposited by the decontamination device 22, preferably by spraying dry sterilizing agent vapor to deposit by condensation a uniform film of mist at least on the internal wall of each preform 14.

Preferably, the hood 74 is arranged directly above the sterilization chamber 21 of the decontamination device 22 and has dimensions complementing the walls of the chamber 19 so as to seal this part of the installation 10.

Advantageously, the hood 74 comprises extraction means (not represented), such as a fan, which are specific to it and which are, for example, capable of sucking an air flow rate of the order of 600 m$^3$ per hour.

Preferably, the suction duct 76 is then connected to the exhaust duct 56 downstream of the extraction means 72 which evacuates, in the exhaust duct 56, a flow of hot air containing sterilizing agent corresponding to the flow of air A and to a flow of air B originating from the suction duct 76 linked to the hood 74.

In a variant which is not represented, the hood 74 or the suction duct 76 have no extraction means and the depression is obtained by connecting the output of the suction duct 76 upstream of the extraction means 72 of the hood 70 and of the exhaust duct 56.

Preferably, the extraction means 72 associated with the hood 70 are dimensioned in relation to the internal volume 20, in particular the oven 26.

Advantageously, the extraction means 72 associated with the hood 70 are, for example, capable of extracting an air flow rate of the order of 20 000 m$^3$ to 30 000 m$^3$ per hour.

The connection of the suction duct 76 associated with the decontamination device 22 to the exhaust duct 56 advantageously makes it possible to dilute the flow of air B containing the highest concentration of sterilizing agent in the flow of air A extracted from the oven 26, in which the concentration of sterilizing agent is lower and the flow rate much greater.

The hot air, charged with sterilizing agent in the gaseous state, corresponding to the flows A and B is thus evacuated into the atmosphere by the extraction system 54, via the exhaust duct 56, the output of which opens outside the industrial premises 16.

As explained previously, the flow of air discharged into the atmosphere by the extraction system 54 of such an installation 10 is naturally and automatically replaced in the industrial premises 16 by air originating generally from outside, and the quality of which is not controlled.

Thus, the parameters such as the temperature, the presence of dust or particulates, or even the relative humidity depend mainly on the geographic location where the production building comprising the industrial premises 16 is located.

Consequently, it may sometimes be necessary to implement additional means to dehumidify or to recool the air by maintaining the temperature of the air in the industrial premises 16 within a temperature range, for example from 20 to 25° Celsius, and do so independently of the temperature of the atmospheric air outside the industrial premises 16.

According to the technical prejudices of the person skilled in the art, the air extracted by the extraction system 54 would not be reintroduced into the industrial premises 16 because of the presence of sterilizing agent in the air, an agent whose harmfulness to man is well known.

Furthermore, the heat transmitted to the air during the circulation through the oven 26 would also lead to a significant increase in the temperature of the air in the industrial premises 16.

Thus, all the factors persuade the person skilled in the art against proceeding with any modification of the existing extraction system 54 in such an installation 10.

However, the identification of the Applicant of the problems inherent in the renewal of the air resulting from such an extraction has in particular led, notwithstanding the existing technical prejudices, to a total reconsideration of the issue.

In accordance with the teachings of the invention, at least a part of the air extracted by the extraction system 54 is recycled after treatment of the sterilizing agent present in the air.

The invention proposes a method for recycling air containing a sterilizing agent in a container manufacturing installation 10, characterized in that said method comprises at least the steps consisting successively in:

(a)—extracting from the interior of the chamber 18 of the installation 10 air containing a sterilizing agent, notably in the gaseous state;

(b)—treating at least a part of said extracted air by treatment means to eliminate all or part of said sterilizing agent in order for the final concentration of sterilizing agent in the air to be less than or equal to a determined threshold value;

(c)—recycling the extracted and treated air by reintroducing at least a part of said air into industrial premises 16 where said installation 10 is located.

Advantageously, the recycled air has a quality better than the air originating from the atmosphere from outside the building, in particular the relative humidity of the air is low because of the circulation of at least a part thereof in the oven 26.

Advantageously, the air is more particularly cleaner because of the filtration applied by the filtration means 36 such as the prefilters and filters 66, 68 of the cooling device 34 of the oven 26.

Advantageously, the heat can also be transferred to a heat transfer fluid in order to be used for other purposes, such as for heating parts of the building other than the industrial premises 16.

Advantageously, the implementation of the method according to the invention makes it possible to produce a more economical and more ecological installation 10.

By virtue of the recycling of the air, the clogging of the filtration means 36, such as the prefilters and filters 66, 68, is in particular limited.

Advantageously, the discharges of sterilizing agent into the atmosphere are limited.

There now follows a nonlimiting description of a preferred exemplary embodiment of the invention in such an installation 10 implementing said air recycling method.

Figure 4:
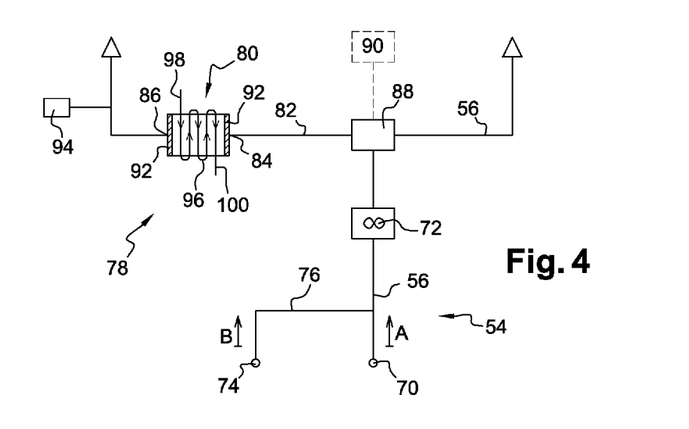
FIG. 4 is a schematic representation of the recycling circuit according to the exemplary embodiment of FIG. 3.

Advantageously, the installation 10 includes an air recycling circuit 78 which, associated with the extraction system 54, comprises means 80 for treating at least a part of the air extracted by the extraction system 54.

Advantageously, the treatment means 80 are suitable for eliminating from said air all or part of the sterilizing agent in order to obtain a recycled air that has a concentration of sterilizing agent less than or equal to a determined threshold value.

By virtue of the treatment of the sterilizing agent, said extracted and treated air can be recycled by being reintroduced into the industrial premises 16 where the installation 10 is located.

Preferably, and as illustrated in FIGS. 3 and 4, the air recycling circuit 78 comprises at least one recirculation duct 82.

The duct 82 for recirculating the extracted air comprises, respectively, an input 84 linked to the exhaust duct 56 of the extraction system 54 and an output 86 preferably opening directly into the external environment formed by the industrial premises 16 where said installation 10 is located.

Advantageously, the treatment means 80 intended to eliminate all or part of the sterilizing agent, present in the extracted air circulating in said recirculation duct 82, are arranged in said duct 82, between the input 84 and the output 86, so as to be passed through by the air.

Preferably, the exhaust duct 56 opening into the atmosphere is not eliminated.

As a variant, the exhaust duct 56 is eliminated and the recirculation duct 82 connected directly to the hood 70 in such a way that all the extracted air is treated and reintroduced into the premises 16.

Advantageously, regulation means 88 are arranged at least in the exhaust duct 56, downstream of the junction with the recirculation duct 82 of the recycling circuit 78.

By virtue of such regulation means 88, it is possible to selectively control the distribution of the flow of extracted air, here between the exhaust duct 56 opening into the atmosphere outside the industrial premises 16 and the recirculation duct 82 opening directly into the industrial premises 16 where the installation 10 is located forming the external environment around the protection chamber 18.

Preferably, the regulation means 88 consist of a flap mounted to move between at least two extreme positions of closure, respectively of closure of the exhaust duct 56 or of closure of the recirculation duct 82.

Advantageously, the regulation means 88 can occupy intermediate positions between the two extreme positions of closure so as to selectively control the distribution of the flow of extracted air between the ducts 56 and 82 to recycle all or only a part of the extracted air.

Advantageously, the recirculation circuit 78 comprises a control unit 90 suitable for selectively driving the position of the extracted air flow regulation means 88.

As a variant, the regulation means 88 consist of one or more valves arranged in the duct or ducts, such as the exhaust duct 56 or the recirculation duct 82, in order to control the circulation of air, or even the flow rate, in each duct.

Preferably, such valve regulation means 88 can be driven by a control unit 90 in order to selectively control their opening and closure.

Advantageously, the treatment means 80 of the recycling circuit 78 comprise at least one oxidizing element suitable for provoking a catalytic reaction during which all or part of the sterilizing agent present in the extracted air is broken down into other neutral products.

Preferably, the oxidizing element consists of a compound comprising platinum, silver or any other appropriate metal for producing the catalyst.

When the sterilizing agent used is advantageously hydrogen peroxide, the latter is then broken down into water and dioxygen, i.e. products that are neither harmful nor toxic.

Preferably, the treatment means 80 consist of at least one filter 92, visible in FIG. 3 by cutaway, which comprises at least said oxidizing element intended to interact with the sterilizing agent present in the extracted air.

The treatment means 80 comprise at least one treatment filter 92 provided with an active substrate comprising said oxidizing element.

As illustrated in FIGS. 3 and 4, the treatment means 80 are arranged to be passed through by the flow of extracted air to be treated circulating in the recirculation duct 82 of the recycling circuit 78 and which is made up of all or part of the sum of the flows of air A and B.

Advantageously, the recycling circuit 78 comprises checking means 94 which, arranged downstream of the treatment means 80, are suitable for checking the concentration of sterilizing agent present in the air so as to check that said concentration is less than the determined threshold value.

Advantageously, the means 94 for checking the recycled air are linked to the control unit 90 which is suitable for selectively actuating the regulation means 88 by virtue of which it is in particular possible to divert the flow of extracted air when the concentration of sterilizing agent is greater than said threshold value, preferably into the exhaust duct 56.

According to a variant that is not represented, the recycling circuit 78 comprises a branch duct which is connected at one end to the recirculation duct 82 between the output and the treatment means 80 and the other end of which is, for example, connected to the exhaust duct 56.

Regulation means are advantageously arranged at the junction of the branch and recirculation ducts, said regulation means being driven, for example by the control unit 90, in order to divert the flow of air to said branch duct when the air checking means 94 measure a concentration which is greater than the threshold value.

Preferably, the other end of the branch duct is connected to the exhaust duct 56 in order to evacuate the nonconforming air to the atmosphere, outside the industrial premises 16.

As a variant, the other end of the branch duct is connected upstream of the treatment means 80 in order to form a loop and for the air to pass once again through the sterilizing agent treatment means 80.

Advantageously, independently of the connection of the output of the branch duct to the duct 82 or 56, additional treatment means are arranged in the branch duct in order to eliminate at least a part of the sterilizing agent and to reduce the concentration thereof in the air.

Advantageously, the recycling circuit 78 comprises means 96 for cooling the recycled air illustrated schematically in FIG. 4.

Preferably, the means 96 for cooling the recycled air can be controlled selectively to regulate the temperature of the air circulating in the recirculation duct 82 in order for the temperature of said recycled air intended to be reintroduced into the industrial premises 16 to be less than or equal to a determined setpoint temperature.

Advantageously, the ambient temperature of the air in said premises 16 is maintained within an optimum range of given temperatures and the temperature rise is limited by virtue of the input of heat contained in the extracted air originating, for the flow of air A, from the oven 26.

According to the exemplary embodiment represented in FIG. 4, the cooling means 96 are arranged in the recirculation duct 82 of the air recycling circuit 78 and are juxtaposed with the sterilizing agent treatment means 80.

Advantageously, the air cooling means 96 are produced in the form of a heat exchanger of the air-fluid type comprising a heat transfer fluid, such as water and an additive, which is made to circulate to produce a heat transfer between said heat transfer fluid and the extracted air so as to transfer the heat contained from the extracted hot air to the heat transfer fluid.

Advantageously, the cooling means 96 formed by the heat exchanger comprise an input 98 and an output 100 which are linked to a circuit in which said heat transfer fluid circulates, the heat transferred to the fluid being able, for example, to be notably used for the purposes of heating industrial premises or of producing hot water.

Advantageously, the decontamination device 22 for the installation 10 for manufacturing containers 12 from preforms 14 made of thermoplastic material intended to ensure the decontamination of the preforms 14 by application of at least one sterilizing agent comprises treatment means 80 suitable for eliminating, from the air extracted from the sterilization chamber 21, all or part of the sterilizing agent in order to obtain, at the output, air exhibiting a lower concentration of sterilizing agent.

The invention claimed is:

1. An installation (10) for manufacturing containers (12) from preforms (14) made of thermoplastic material, comprising:
  at least one protection chamber (18) configured to isolate an internal volume (20) of the installation (10) from ambient air contained in industrial premises (16) where the installation (10) is located, said at least one protection chamber (18) comprising, arranged in said internal volume (20), at least:
  an inlet (E) for receiving preforms (14) from the industrial premises (16);
  a transforming unit (38) being configured for receiving the preforms (14) and for transforming the preforms (14) into containers (12);
  a decontamination device (22) and a thermal condition unit being located between the inlet (E) and the transforming unit (38),
  the decontamination device (22) being configured for receiving the preforms and for decontaminating the preforms (14) by application of at least one sterilizing agent in a vapor form, and
  the thermal conditioning unit for being configured for receiving preforms (14), said thermal conditional unit consisting of an oven (26) comprising means for heating (30) associated with an air cooling device (34) which comprises means for filtering the ambient air (36) and means for ventilating (32) for ensuring a cooling of at least a part of the preforms (14);
  an extraction system (54) configured for extracting, from the internal volume (20) of the at least one protecting chamber, air charged with sterilizing agent vapor to evacuate the air charged with sterilizing agent vapor into an atmosphere outside the industrial premises (16), said extraction system (54) comprising:
  at least one means for extraction linked to at least one location in the internal volume (20), said at least one means for extraction being configured to remove air charged with sterilizing agent vapor from said at least one location in the internal volume (20), and
  at least one exhaust duct (56) linked to said at least one means for extraction, said at least one exhaust duct (56) being configured to evacuate said air charged with sterilizing agent vapor removed from said at least one location in the internal volume (20); and
  an air recycling circuit (78) being linked to the extraction system (54) to receive at least a part of said air charged with sterilizing agent vapor and comprising:
  means for treating air (80) configured for eliminating all or part of the sterilizing agent vapor from at least a part of said air charged with sterilizing agent vapor extracted using the extraction system (54) so as to obtain treated air having a concentration of sterilizing agent less than or equal to a determined threshold value,
  an outlet being linked to ambient air of the industrial premises (16) forming an external environment of said installation (10), wherein said outlet being configured to recycle the treated air by reintroducing said treated air into the ambient air.

2. The installation (10) as claimed in claim 1, wherein the air recycling circuit (78) comprises at least one recirculation duct (82) comprising, respectively, an input linked to an exhaust duct (56) of the extraction system (54) and an output opening directly into the industrial premises (16), said means for treating air (80) being at least arranged between said input and output of the at least one recirculation duct (82).

3. The installation (10) as claimed in claim 2, wherein the air recycling circuit (78) comprises means for regulating air flow (88) configured for selectively controlling distribution of flow of extracted air between the exhaust duct (56) opening into the atmosphere outside the industrial premises (16) and the at least one recirculation duct (82) opening directly into the industrial premises (16) where the installation (10) is located.

4. The installation (10) as claimed in claim 2, wherein the means for treating air (80) are made up of at least one filter (92) arranged to be passed through by a flow of extracted air to be treated circulating in the at least one recirculation duct (82) of the recycling circuit (78) and comprising at least one oxidizing element suitable for provoking a catalytic reaction with the air charged with sterilizing agent in order to break down all or part of the sterilizing agent present in the air into other neutral products and achieve at least said threshold value.

5. The installation (10) as claimed in claim 1, wherein the air recycling circuit (78) checks a concentration of sterilizing agent present in the air downstream of the means for treating air (80), for analyzing the concentration of sterilizing agent present in the air so as to check the concentration of sterilizing agent against said determined threshold value.

6. The installation (10) as claimed in claim 5, wherein the air recycling circuit (78) checks the concentration of sterilizing agent present in the air using a control unit (90) which is configured for selectively actuating means for regulating air flow (88) when the concentration of sterilizing agent is greater than said threshold value, and suitable for diverting a flow of extracted air to the exhaust duct (56).

7. The installation (10) as claimed in claim 6, wherein the recycling circuit (78) comprises a branch duct, an input of which is linked to the at least one recirculation duct (82), downstream of the means for treating air (80) and upstream of the output of the exhaust duct (56), so as to evacuate, before reintroduction into the industrial premises (16), any air analyzed as having a concentration of sterilizing agent greater than said threshold value.

8. The installation (10) as claimed in claim 2, wherein the recycling circuit (78) comprises a means for cooling air (96) which can be controlled selectively to regulate temperature of the air circulating in the recirculation duct (82) so that a temperature of said recycled air, intended to be reintroduced into the industrial premises (16), is less than or equal to a setpoint temperature determined to maintain ambient temperature of the air in said industrial premises (16) within an optimum temperature range.

9. The installation (10) as claimed in claim 1, wherein the extraction system (54) comprises at least a first means for extraction (74) associated with the decontamination device (22) and a second means for extraction (70) associated with the oven (26) and means for treating air (80) are at least arranged between a sterilization chamber (21) of the device (22) from which the first means for extraction (74) suck the air charged with sterilizing agent and a suction duct (76), the input of which is linked to said first means for extraction (74) and the output of which is linked to the exhaust duct (56).

10. The installation (10) as claimed in claim 1, wherein the sterilizing agent is hydrogen peroxide.

11. The installation (10) as claimed in claim 1, wherein said at least one means for extraction comprises a hood.

12. The installation (10) as claimed in claim 1, wherein:
said decontamination device (22) is linked to said inlet (E) of the at least one protection chamber (18) and is configured for receiving the preforms from said inlet (E),
said thermal conditioning unit is linked to said decontamination device (22) and is configured for receiving preforms (14) from said decontamination device (22), and
said transforming unit (38) is linked to said thermal conditioning unit and is configured for receiving the preforms (14) from said thermal conditioning unit.

13. The installation (10) as claimed in claim 1, wherein:
said thermal conditioning unit is linked to said inlet (E) of the at least one protection chamber (18) and is configured for receiving the preforms from said inlet (E),
said decontamination device (22) is linked to said thermal conditioning unit and is configured for receiving preforms (14) from said thermal conditioning unit, and
the transforming unit (38) is linked to said decontamination device (22) and is configured for receiving the preforms (14) from said thermal conditioning unit.

14. An installation (10) for manufacturing containers (12) from preforms (14) made of thermoplastic material, comprising:
at least one protection chamber (18) configured to isolate an internal volume (20) of the installation (10) from ambient air contained in industrial premises (16) where the installation (10) is located, said at least one protection chamber (18) comprising, arranged in said internal volume (20), at least:
an inlet (E) for receiving preforms (14) from the industrial premises (16);
a decontamination device (22) being linked to said inlet (E) of the at least one protection chamber (18), said decontamination device (22) being configured for receiving the preforms from said inlet (E) and for decontaminating the preforms (14) by application of at least one sterilizing agent in a vapor form,
a thermal conditioning unit being linked to said decontamination device (22) and being configured for receiving preforms (14) from said decontamination device (22), said thermal conditional unit consisting of an oven (26) comprising means for heating (30) associated with an air cooling device (34) which comprises means for filtering the ambient air (36) and means for ventilating (32) for ensuring a cooling of at least a part of the preforms (14),
a transforming unit (38) being linked to said thermal conditioning unit, said transforming unit (38) being configured for receiving the preforms (14) from said thermal conditioning unit and for transforming the preforms (14) into the containers (12);
an extraction system (54) configured for extracting, from the internal volume (20) of the at least one protection chamber, air charged with sterilizing agent vapor to evacuate the air charged with sterilizing agent vapor into an atmosphere outside the industrial premises (16), said extraction system (54) comprising:
a first means for extraction (74) having an input linked to said decontamination device (22) and an output, said first means for extraction (74) configured for removing the air charged with sterilizing agent vapor from said decontamination device (22),
a second means for extraction (70) having an input linked to said oven (26) and an output, said second means for extraction (70) configured for removing the air charged with sterilizing agent vapor from said oven (26), and an output (56) linked to at least said output of said first means for extraction (74) and said output of said second means for extraction (70); and an air recycling circuit (78) being linked to said output (56) of said extraction system (54), the air recycling circuit (78) being configured to receive said air charged with sterilizing agent vapor and comprising:

means for treating air (80) configured for eliminating all or part of the sterilizing agent vapor from at least a part of said air charged with sterilizing agent vapor extracted using the extraction system (54), said means for treating air (80) comprising at least one oxidizing element configured for provoking a catalytic reaction to break down the sterilizing agent into neutral products, wherein the air recycling circuit checks a concentration of the the air treated by said means for treating air (80), to with the ambient air of the industrial premises (16) forming an external environment of said installation (10), said outlet being configured to recycle the treated air having a concentration of sterilizing agent less than or equal to a determined threshold value by reintroducing said treated air into the ambient air.

15. The installation (10) as claimed in claim 14, wherein the sterilizing agent is hydrogen peroxide.

16. The installation (10) as claimed in claim 14, wherein said first means for extraction (74) and said output of said second means for extraction (70) comprise hoods.

* * * * *